United States Patent Office 3,639,402
Patented Feb. 1, 1972

3,639,402
PROCESS FOR MAKING PIPERAZINES FROM AZIRIDINES
Clarence R. Dick, Lake Jackson, Tex., assignor to The Dow Chemical Company, Midland, Mich.
No Drawing. Filed Dec. 12, 1967, Ser. No. 689,782
Int. Cl. C07d *51/70*
U.S. Cl. 260—268                10 Claims

ABSTRACT OF THE DISCLOSURE

A process for the preparation of 1,4-disubstituted piperazines which comprises reacting an N-substituted aziridine in the presence of a hydrohalide acid and the corresponding soluble metal halide salt, or in an excess of a soluble metal halide salt and a strong non-hydrohalide acid.

BACKGROUND OF THE INVENTION

The preparation of piperazine by dimerization of aziridine (ethylenimine), as well as the preparation of substituted piperazines from the dimerization of substituted aziridines, is well known in the art. Halogen acids, and halide salts plus water, are well known as dimerization agents in this reaction. However, these reactions give relatively low yields and the products are difficult to separate from the aqueous systems employed.

SUMMARY OF THE INVENTION

My invention is an improved process for the dimerization of N-substituted aziridines to 1,4-disubstituted piperazines. The process comprises reacting, in the presence of an inert, essentially anhydrous solvent, an N-substituted aziridine of the formula

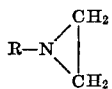

wherein R is a group containing from 1 to 10 carbon atoms, such groups being alkyl, aryl or arylalkyl, in the presence of a halogen acid (HX) and the corresponding soluble metal halide salt (MX), or in the presence of an excess of a soluble metal halide salt (MX) and a strong non-hydrohalide acid, wherein X is Cl, Br or I, and M is an alkali metal, such as Na or K, or an alkaline earth metal, such as Mg, Ca or Sr.

The N-substituted aziridines which are useful in this invention are such as those in which the substituent has from 1 to 10 carbon atoms, and the substituent group is an alkyl, aryl or arylalkyl group. Examples of such aziridines are N-ethylaziridine, N-decylaziridine, N-(2-phenylethyl)aziridine, N - allylaziridine, N - phenylaziridine, N-methylaziridine and N-butylaziridine. The mole ratio of aziridine/acid is suitably from about 2 to about 50, and preferably is from about 5 to 20.

Any soluble metal salt which is a source of the halide ion is useful in this invention. Examples of these salts are soluble alkali metal and alkaline earth metal halide salts, such as the chloride, bromide and iodide salts of Na, K, Mg, Ca or Sr.

The unexpectedly good yields of the instant invention appear to be at least partly dependent upon the presence of a high concentration of the halide ion in a suitable acidic medium. Therefore it is possible to use as a catalyst (1) a soluble metal salt and the corresponding hydrohalide acid, or (2) an excess of a soluble metal salt with a strong non-hydrohalide acid. The hydrohalide acids which are useful in this invention are hydrobromic acid, hydrochloric acid and hydriodic acid. Examples of useful strong non-hydrohalide acids are sulfuric acid, perchloric acid, p-toluenesulfonic acid, methanesulfonic acid, and trifluoroacetic acid.

The solvent employed can generally be any inert, essentially nonaqueous solvent, for example the lower ketones containing from 3 to 6 carbon atoms, such as methylethyl ketone and acetone; lower alcohols containing from 1 to 4 carbon atoms, such as methanol, butanol and propanol; cyclic ethers, such as tetrahydrofuran and 1,4-dioxane; and polyglycol ethers such as ethyleneglycol dimethyl ether, or diethyl ether, and tetraethyleneglycol dimethyl ether. Up to 10% by weight of water content is not harmful to the process of this invention.

The reaction will proceed at a temperature of from about −10° C. to about 150° C., although a range of about 20° to about 60° C. is preferred. The reaction should generally be allowed to proceed until the N-substituted aziridine has achieved maximum conversion, which, in most cases, is approximately 100%. The progress of this conversion can be checked at intervals by gas-liquid chromatography. A reaction time of 4 hours to 72 hours is generally preferred.

SPECIFIC EMBODIMENTS OF THE INVENTION

The following examples are offered as specific embodiments of my invention, but they are in no way intended to limit same.

Example I.—1,4-diethylpiperazine

The following reactants were placed in the given order in a suitable container:

|  | Grams |
|---|---|
| Sodium iodide | 5.02 |
| Methylethyl ketone (distilled) | 75.4 |
| N-ethylaziridine | 4.337 |
| Hydriodic acid (conc.) | 1.6 |

The reaction was allowed to proceed at room temperature for 214 minutes. The reaction mixture was then analyzed by gas-liquid chromatography and found to have achieved 96.2% conversion, with an 83% yield of 1,4-diethylpiperazine. The mixture was then heated for 3 hours at 40° C., cooled to room temperature and again analyzed by the same method. The results were found to be a 98% conversion of the aziridine and a 95% yield of the piperazine.

Example II.—To demonstrate the effect of sodium iodide

Example I above was repeated except that sodium iodide was omitted. It was found that before heating the N-ethylaziridine had achieved 88.9% conversion, with a 53.2% yield of 1,4-diethylpiperazine. After heating, there was found a 99+% conversion of N-ethylaziridine, and a 73% yield of 1,4-diethylpiperazine.

Example III.—The adverse effect of an essentially aqueous system

Example I was again run except that 75 grams of a 50/50 mixture of water/acetone was used in the place of the methylethyl ketone as the solvent. It was found that N-ethylaziridine had achieved 97% conversion, with a yield of 27% 1,4-diethylpiperazine.

Example IV.—1,4-di-N-decylpiperazine

Using the same method as Example I above, but replacing the N-ethylaziridine with 12.83 g. of N-decylaziridine, a 92.9% yield of 1,4-di-N-decylpiperazine and a 100% conversion of aziridine were obtained.

Example V.—1,4-bis(2-phenylethyl)piperazine

The following experiment was run as in Experiment I, the following reactants being added in order:

| | Grams |
|---|---|
| Sodium iodide | 10.02 |
| Methylethyl ketone | 146.8 |
| 1-(2-phenylethyl)aziridine | 17.96 |
| Hydriodic acid | 3.2 |

Analysis showed a 71% yield of 1,4-bis(2-phenylethyl) piperazine, based on a 100% aziridine conversion.

I claim:

1. A process for the preparation of a 1,4-disubstituted piperazine which comprises reacting by contacting, at a temperature of from about −10° to about 150° C., an N-substituted aziridine of the formula

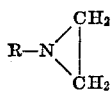

wherein R is an alkyl, phenyl or phenylalkyl group, the alkyl moieties thereof having from 1 to 10 carbon atoms, in the presence of an inert, essentially nonaqueous solvent, with (1) a hydrohalide acid and a corresponding soluble alkali or alkaline earth metal halide salt, or (2) an excess of a soluble alkali or alkaline earth metal halide salt and a strong nonhydrohalide acid selected from the group consisting of sulfuric acid, perchloric acid, p-toluenesulfonic acid, methane sulfonic acid and tri fluoroacetic acid, the halogen in said acid and salt being Cl, Br or I.

2. The process of claim 1 wherein the hydrohalide acid is HI.

3. The process of claim 1 wherein the hydrohalide acid is HBr.

4. The process of claim 1 wherein the hydrohalide acid is HCl.

5. A process of claim 1 wherein the N-substituted aziridine is an N-alkylaziridine.

6. A process of claim 1 wherein the N-substituted aziridine is an N-phenylalkyl aziridine.

7. A process of claim 1 wherein the N-substituted aziridine is an N-phenylaziridine.

8. A process of claim 1 wherein the temperature is from about 20° to about 60° C.

9. A process of claim 1 wherein the aziridine/acid mole ratio is from about 2 to about 50.

10. The process of claim 1 wherein said acid is sulfuric acid, p-toluenesulfonic acid, methanesulfonic acid or trifluoroacetic acid; and, said salt is a soluble chloride, bromide or iodide salt of an alkali metal or alkaline earth metal.

References Cited

UNITED STATES PATENTS

| 3,106,558 | 10/1963 | Poppelsdorf | 260—268 |
| 3,373,162 | 3/1968 | Dick | 260—268 |
| 3,154,552 | 10/1964 | Wiepert et al. | 260—268 |
| 3,154,533 | 10/1964 | Weipert | 260—268 |

DONALD G. DAUS, Primary Examiner

U.S. Cl. X.R.

260—239 E, 268 R